US011282517B2

United States Patent
Koga et al.

(10) Patent No.: US 11,282,517 B2
(45) Date of Patent: Mar. 22, 2022

(54) IN-VEHICLE DEVICE, NON-TRANSITORY COMPUTER-READABLE MEDIUM STORING PROGRAM, AND CONTROL METHOD FOR THE CONTROL OF A DIALOGUE SYSTEM BASED ON VEHICLE ACCELERATION

(71) Applicant: TOYOTA JIDOSHA KABUSHIKI KAISHA, Toyota (JP)

(72) Inventors: Ko Koga, Tokyo (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 16/372,954

(22) Filed: Apr. 2, 2019

(65) Prior Publication Data
US 2019/0362717 A1    Nov. 28, 2019

(30) Foreign Application Priority Data
May 24, 2018    (JP) .............................. JP2018-099712

(51) Int. Cl.
 *G10L 15/22*    (2006.01)
(52) U.S. Cl.
 CPC ........ *G10L 15/22* (2013.01); *G10L 2015/223* (2013.01); *G10L 2015/226* (2013.01)
(58) Field of Classification Search
 CPC ............... G10L 15/22; G10L 2015/223; G10L 2015/226
 USPC ....................................................... 704/251
 See application file for complete search history.

(56) References Cited

U.S. PATENT DOCUMENTS

| 2002/0120374 | A1* | 8/2002 | Douros .................. | G07C 5/085 701/34.4 |
| 2006/0155456 | A1* | 7/2006 | Kakuda ..................... | G01P 7/00 701/70 |
| 2009/0216389 | A1* | 8/2009 | Placke ................... | G01C 21/36 701/1 |
| 2011/0083075 | A1* | 4/2011 | MacNeille .............. | G10L 15/22 715/728 |
| 2018/0204570 | A1* | 7/2018 | Puranik .................. | B60K 37/06 |
| 2019/0034048 | A1* | 1/2019 | Gibbons ............... | G06F 3/0482 |

(Continued)

FOREIGN PATENT DOCUMENTS

| JP | 08-297497 A | 11/1996 |
| JP | 9-127981 A | 5/1997 |
| JP | 2000-338994 A | 12/2000 |

(Continued)

OTHER PUBLICATIONS

Zhang et al., "Driver Cognitive Workload Estimation: A Data-driven Perspective", 2004 IEEE Intelligent Transportation Systems Conference, Oct. 3-6, 2004, pp. 642-647 (7 pages).

*Primary Examiner* — Pierre Louis Desir
*Assistant Examiner* — Nicole A K Schmieder
(74) *Attorney, Agent, or Firm* — Sughrue Mion, PLLC (57) ABSTRACT

An information processing apparatus includes an acquisition unit configured to acquire acceleration of a vehicle, a controller configured to execute a speech dialogue with a driver of the vehicle, an input unit configured to receive a speech input by the driver, and an output unit configured to execute a speech output to the driver. The controller dynamically controls a response time in the speech dialogue with the driver based on the acceleration of the vehicle.

10 Claims, 4 Drawing Sheets

(56) References Cited

U.S. PATENT DOCUMENTS

2019/0115016 A1* 4/2019 Seok .................. G10L 15/22
2020/0184950 A1* 6/2020 Iwase ................ G10L 15/1822

FOREIGN PATENT DOCUMENTS

| JP | 2002-042300 A | 2/2002 | |
|---|---|---|---|
| JP | 2002-055696 A | 2/2002 | |
| JP | 2004-217101 A | 8/2004 | |
| WO | WO-2011000382 A2 * | 1/2011 | ............ B60W 50/14 |
| WO | 2018/034169 A1 | 2/2018 | |

* cited by examiner

IN-VEHICLE DEVICE, NON-TRANSITORY COMPUTER-READABLE MEDIUM STORING PROGRAM, AND CONTROL METHOD FOR THE CONTROL OF A DIALOGUE SYSTEM BASED ON VEHICLE ACCELERATION

INCORPORATION BY REFERENCE

The disclosure of Japanese Patent Application No. 2018-099712 filed on May 24, 2018 including the specification, drawings and abstract is incorporated herein by reference in its entirety.

BACKGROUND

1. Technical Field

The present disclosure relates to an information processing apparatus, a non-transitory computer-readable medium storing a program, and a control method.

2. Description of Related Art

In a related art, there is a technology to execute a speech dialogue with a driver of a vehicle. For example, the driver may operate an in-vehicle device mounted on the vehicle through the speech dialogue with a speech operation system. Meanwhile, for example, it is not always preferable for the driver of the vehicle to execute the speech dialogue while the driver drives the vehicle since the dialogue makes the driver distracted. For example, Japanese Unexamined Patent Application Publication No. 2004-217101 discloses a voice-operated device for a vehicle that determines a degree of risk of the vehicle from a driving status of the vehicle, and controls a voice operation in accordance with the degree of the risk. In addition, Japanese Unexamined Patent Application Publication No. 08-297497 discloses a voice processing device for a vehicle that inhibits a control operation of an in-vehicle device which is executed by the voice content when it is detected that the vehicle reaches or exceeds a predetermined speed. Further, Japanese Unexamined Patent Application Publication No. 2002-042300 discloses a degree of approaching risk detecting device for a vehicle that detects an approach risk index for an obstacle, and detects an approach risk degree for the obstacle based on a vehicle state and the approach risk index. Moreover, Japanese Unexamined Patent Application Publication No. 2002-055696 discloses a voice operation device for a vehicle that suspends the measurement of a reception time of a driver's voice for an operation or extends the reception time during a driving operation which requires the driver's attentiveness.

SUMMARY

Recent research in the cognitive science field has found that a cognitive load can be generated to a driver when the driver executes a speech dialogue. However, the related art described above assumes beforehand a condition in which the driver of a vehicle should pay attention to a driving operation, and then controls a speech operation according to detection of an occurrence of the corresponding condition without considering the cognitive load of the driver due to the speech dialogue. For this reason, in the related art, even though driver distraction does not occur since the cognitive load due to the speech dialogue is actually sufficiently low, there are cases in which the speech operation is controlled by an occurrence of the condition which is assumed beforehand. Alternatively, in the related art, even though the driver distraction may occur since the cognitive load due to the speech dialogue is actually relatively high, the speech operation is not controlled unless the condition which is assumed beforehand occurs. Accordingly, there is room for improvement in the technology to execute the speech dialogue with the driver of the vehicle.

The present disclosure provides a technology to execute a speech dialogue with a driver of a vehicle.

An information processing apparatus according to a first aspect of the present disclosure includes an acquisition unit configured to acquire acceleration of a vehicle, a controller configured to execute a speech dialogue with a driver of the vehicle, an input unit configured to receive a speech input by the driver, and an output unit configured to execute a speech output to the driver. The controller is configured to dynamically control a response time in the speech dialogue with the driver based on the acceleration of the vehicle.

The controller may dynamically control the response time by adjusting a parameter regarding recognition speed of a speech recognition decoder based on the acceleration of the vehicle.

The controller may calculate an index value indicating a change in the acceleration of the vehicle based on the acceleration of the vehicle and control the response time such that the response time becomes longer when the index value is within a second range than when the index value is within a first range. An upper limit of the first range is below a lower limit of the second range.

The controller may stop the speech dialogue with the driver when the index value is within a third range. An upper limit of the second range is below a lower limit of the third range, or an upper limit of the third range is below a lower limit of the first range.

The controller may issue an alarm for the driver when the controller stops the speech dialogue with the driver.

The controller may calculate, based on the acceleration of the vehicle, variance, standard deviation, or a difference between a maximum value and a minimum value of the acceleration of the vehicle in every predetermined period of time as the index value.

A second aspect of the present disclosure relates to a non-transitory computer-readable medium storing a program to cause an information processing apparatus to execute a process. The process includes acquiring acceleration of a vehicle, starting a speech dialogue with a driver of the vehicle, receiving a speech input by the driver, determining a response time in the speech dialogue with the driver based on the acceleration of the vehicle, and executing, when the response time passes from the speech input, a speech output to the driver.

A third aspect of the present disclosure relates to a method of controlling an information processing apparatus. The method includes acquiring acceleration of a vehicle, starting a speech dialogue with a driver of the vehicle, receiving a speech input by the driver, determining a response time in the speech dialogue with the driver based on the acceleration of the vehicle, and executing, when the response time passes from the speech input, a speech output to the driver.

With each aspect of the present disclosure, it is possible to improve a technology to execute a speech dialogue with a driver of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described.

Overview of Embodiments

Figure 1:
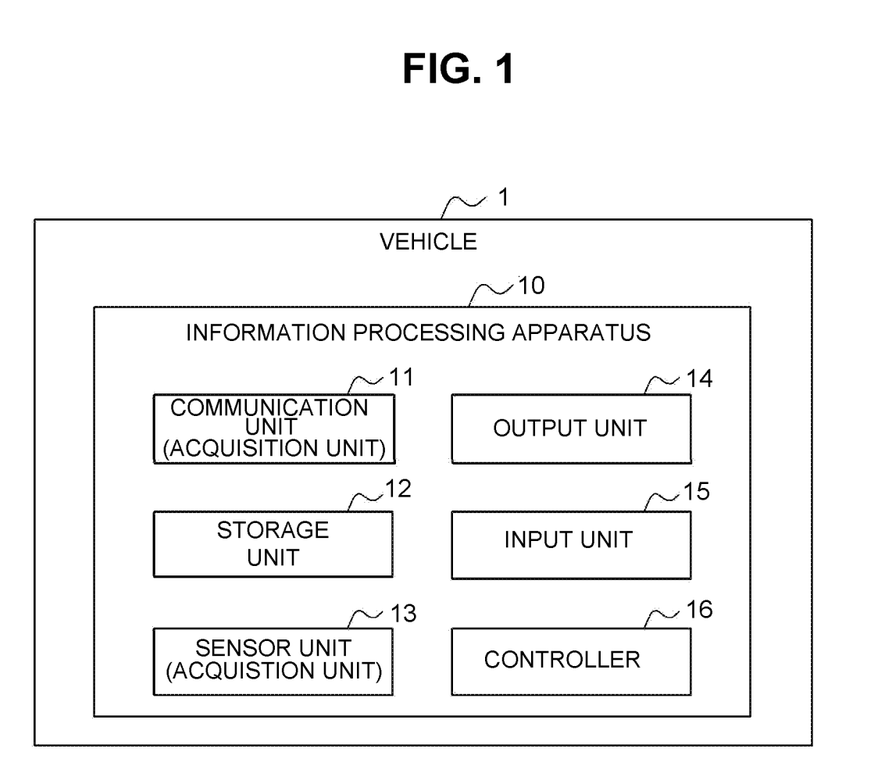
FIG. 1 is a block diagram schematically illustrating a configuration of an information processing apparatus mounted on a vehicle according to one embodiment of the present disclosure.

With reference to FIG. 1, an overview of a vehicle 1 according to one embodiment of the present disclosure will be described. The vehicle 1 is, for example, a car, but may be any vehicle which people can get in. The vehicle 1 operates according to a driving operation by a driver. For example, the vehicle 1 may be capable of a partial autonomous driving corresponding to levels 1 to 4 defined by the Society of Automotive Engineers (SAE). An information processing apparatus 10 is mounted on the vehicle 1. The information processing apparatus 10 executes a speech dialogue with a driver of the vehicle 1. The information processing apparatus 10 may, for example, search for information, operate an in-vehicle device mounted on the vehicle 1, and chat with the driver through the speech dialogue with the driver. For example, an in-vehicle device such as a navigation device or a general-purpose apparatus such as a smart phone or a Personal Computer (PC) carried by the driver, may be used as the information processing apparatus 10.

In the present embodiment, the information processing apparatus 10 dynamically controls a response time (for example, a time from the end of the driver's speech to the start of speech of the information processing apparatus 10) in the speech dialogue with the driver based on acceleration of the vehicle 1. Such a configuration is based on two novel findings which an inventor of the present disclosure has found through various experiments to study an influence that a speech dialogue system has on a driving behavior of the driver.

A first finding is that cognitive load of the driver due to the speech dialogue significantly influences a change of the acceleration of the vehicle 1 and the change of the acceleration increases as the cognitive load increases. Here, "the change of the acceleration" is represented by, for example, variance, standard deviation, or a difference between a maximum value and a minimum value of the acceleration in every predetermined period of time, but is not limited thereto, and may also be represented by any index value indicating a variation of the acceleration. The first finding is, for example, based on an experiment result that the change in the acceleration becomes larger when the driver operates the in-vehicle device through speech than when the driver operates the in-vehicle device with a hand while watching the in-vehicle device, and a experiment result that the change in the acceleration of the vehicle 1 becomes larger when the driver executes a complicated task than when the driver executes a relatively simple task through the speech dialogue. According to the first finding, a degree of the cognitive load of the driver due to the speech dialogue can be estimated by considering the acceleration of the vehicle 1.

A second finding is that the cognitive load of the driver due to the speech dialogue is smaller when the response time in the speech dialogue is long than when the response time is short. The second finding is based on an experiment result that driving performance of the driver is influenced less when the response time is long than when the response time is short. According to the second finding, the degree of the cognitive load of the driver due to the speech dialogue can be adjusted by controlling the response time in the speech dialogue.

As described above, with the information processing apparatus 10 according to the present embodiment, the response time in the speech dialogue is dynamically controlled based on the acceleration of the vehicle 1. For this reason, when it is estimated that, based on the acceleration of the vehicle 1, the cognitive load of the driver is large, it is possible to control the speech dialogue in consideration of the cognitive load of the driver such as reducing the cognitive load by lengthening the response time. Therefore, the technology to execute the speech dialogue with the driver of the vehicle 1 is improved.

Configuration of Information Processing Apparatus

Subsequently, the configuration of the information processing apparatus 10 according to the present embodiment will be described in detail. The information processing apparatus 10 includes a communication unit 11, a storage unit 12, a sensor unit 13, an output unit 14, an input unit 15, and a controller 16.

The communication unit 11 includes any communication module that communicates with the vehicle 1. The communication module communicating with the vehicle 1 is, but not limited to, for example, a communication module corresponding to an in-vehicle network, such as a Controller Area Network (CAN), or a communication module corresponding to near-field wireless communication, such as Bluetooth®. The information processing apparatus 10 can communicate with the vehicle 1 through the communication unit 11. For example, the communication unit 11 may function as an acquisition unit that acquires the acceleration of the vehicle 1 from an acceleration sensor mounted on the vehicle 1. Further, the communication unit 11 may include, for example, a communication module corresponding to a mobile communication standard such as Fourth Generation (4G) and Fifth Generation (5G) mobile communication. In this case, the information processing apparatus 10 can be connected to an external network such as the Internet through the communication unit 11.

The storage unit 12 includes one or more memories. In the present embodiment, "memory" is, but not limited to, for example, a semiconductor memory, a magnetic memory, or an optical memory. Each memory included in the storage unit 12 may function as, for example, a primary memory unit, a secondary memory unit, or a cache memory. The storage unit 12 stores any information used for the operation of the information processing apparatus 10. The storage unit 12 may store, for example, a system program and an application program. The information stored in the storage unit 12 can be updated with information acquired from an external network through, for example, the communication unit 11.

In the present embodiment, the storage unit 12 stores speech dialogue software. For example, the speech dialogue software includes a sound model, a language model, and a speech recognition decoder, but is not limited thereto, and may include any information used for the speech dialogue. The speech recognition decoder is a program that converts input speech into a string of words and recognizes the converted input speech, using a sound model and a language model. The speech recognition decoder has various parameters regarding speech recognition of the input speech. For example, the speech recognition decoder may have a parameter regarding recognition speed of the input speech. According to the adjustment of the corresponding parameter, the recognition speed of the input speech is changed.

The sensor unit 13 includes the acceleration sensor. The sensor unit 13 functions as an acquisition unit that acquires the acceleration of the vehicle 1. Alternatively, the information processing apparatus 10 may not include the sensor unit 13 but the acceleration sensor mounted on the vehicle 1 may be used as the sensor unit 13. In this case, the above-described communication unit 11 functions as the acquisition unit that acquires the acceleration from the vehicle 1.

The output unit 14 includes one or more output interfaces that output information to the user. For example, each output interface included in the output unit 14 is, but not limited to, a display which outputs information in the form of video, a speaker which outputs information in the form of speech, or a vibrator which outputs information in the form of vibration. For example, the display is a panel display or a head-up display, but is not limited thereto, and may be any output interface. In the present embodiment, "video" may include a text, a still image, and a moving image. The display, the speaker, and the vibrator mounted on the vehicle 1 may be used as the output unit 14.

The input unit 15 includes one or more input interfaces that detect a user input. For example, each input interface included in the input unit 15 is a physical key, a capacitive key, a touch screen integrally installed with the panel display of the output unit 14, a microphone which receives a speech input, and the like, but is not limited thereto, and may be any input interface.

The controller 16 includes one or more processors. In the present embodiment, "processor" is a general-purpose processor or a processor dedicated to a specific process, but is not limited thereto. The controller 16 controls the overall operation of the information processing apparatus 10.

For example, the controller 16 executes the speech dialogue with the driver of the vehicle 1. Specifically, when a predetermined speech input is received through the input unit 15, the controller 16 starts the speech dialogue using the speech dialogue software stored in the storage unit 12. During execution of the speech dialogue, the controller 16 outputs, from the output unit 14, response speech, in response to the speech input of the driver received through the input unit 15. In addition, the controller 16 executes various processes according to a speech input of the driver. For example, the controller 16 can execute a process of searching for information through the communication unit 11 and an external network, a process of controlling an in-vehicle device mounted on the vehicle 1, and a process of outputting information through the output unit 14, but is not limited thereto, and may execute any process according to the speech input. Here, the parameter regarding the recognition speed of the speech recognition decoder described above is set to a predetermined reference value. The corresponding reference value is, for example, a value that minimizes the response time within a range in which a desired recognition rate can be achieved. Hereinafter, the minimized response time is also referred to as a "standard time".

Further, the controller 16 acquires the acceleration of the vehicle 1 through the acquisition unit (the communication unit 11 or the sensor unit 13) during execution of the speech dialogue. The controller 16 calculates variance, standard deviation, or a difference between a maximum value and a minimum value of the acceleration of the vehicle 1 in every predetermined period of time as an index value $\alpha$ representing a change in the acceleration. The controller 16 determines the degree of the cognitive load according to the calculated index value $\alpha$.

Figure 2:
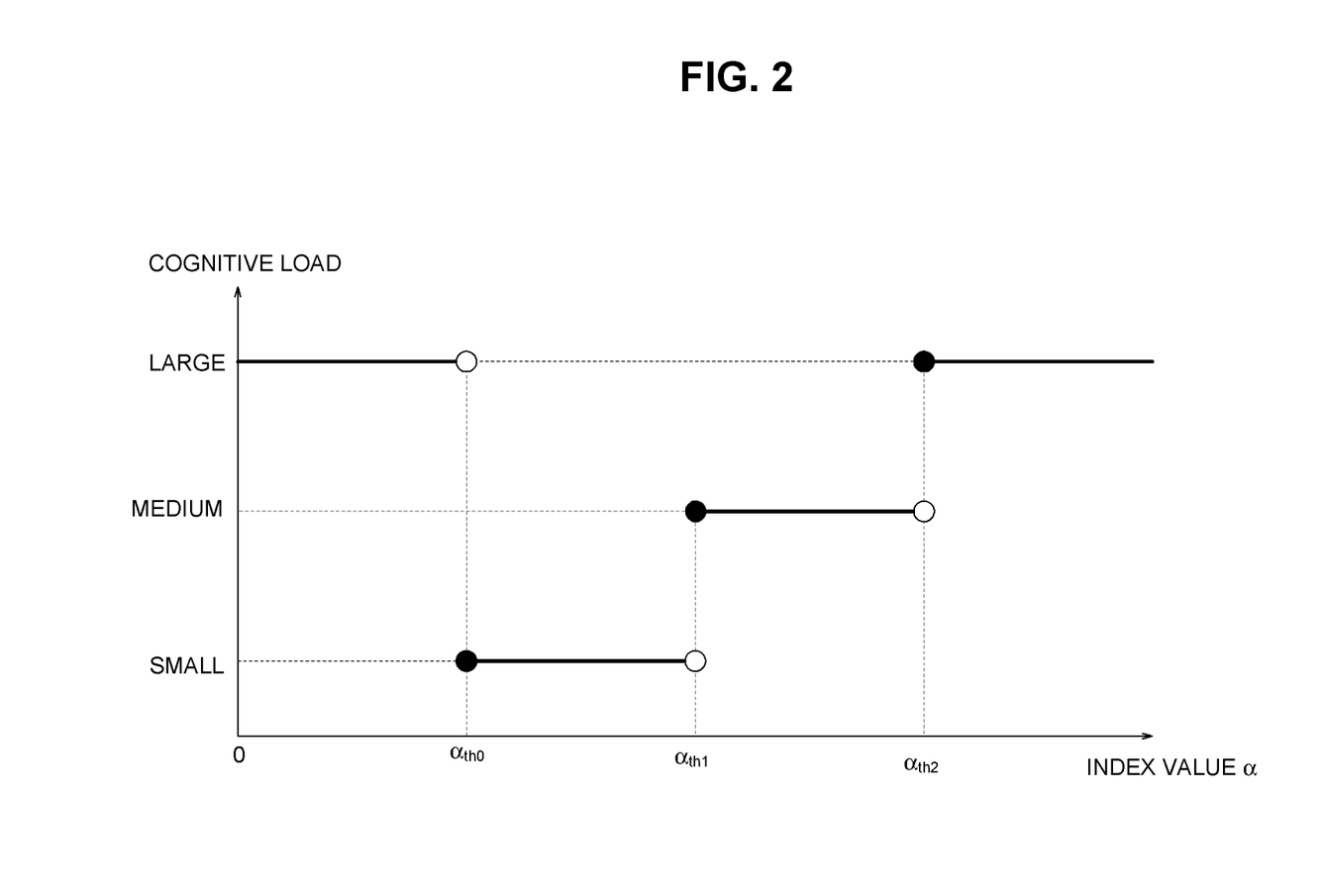
FIG. 2 is a diagram illustrating an example of a relationship between an index value and a cognitive load based on acceleration of the vehicle.

With reference to FIG. 2, a relationship between the index value $\alpha$ and the cognitive load in the present embodiment will be described as an example. In a graph illustrated in FIG. 2, a horizontal axis represents the index value $\alpha$ and a vertical axis represents the degree of the cognitive load. In the present embodiment, the degree of the cognitive load is divided into three levels, "small", "medium", and "large" sequentially, from the smallest degree of the cognitive load according to whether the index value $\alpha$ is within a first range and whether the index value $\alpha$ is within a second range. An upper limit of the first range is below a lower limit of the second range. The first range and the second range may be consecutive to or separate from each other. In the example of FIG. 2, the first range is equal to or larger than $\alpha_{th0}$ and smaller than $\alpha_{th1}$, and the second range is equal to or larger than $\alpha_{th1}$ and smaller than $\alpha_{th2}$, and the first and second ranges are consecutive to each other. Each of $\alpha_{th0}$, $\alpha_{th1}$, and $\alpha_{th2}$ is a predetermined constant and is predetermined based on, for example, an experiment or a simulation.

It is estimated that the change in the acceleration of the vehicle 1 and the cognitive load of the vehicle 1 are larger when the index value $\alpha$ is within the second range than when the index value $\alpha$ is within the first range. Accordingly, when the index value $\alpha$ is within the first range (that is, $\alpha_{th0} \le \alpha < \alpha_{th1}$), the controller 16 determines that the cognitive load is "small". In addition, when the index value $\alpha$ is within the second range (that is, $\alpha_{th1} \le \alpha < \alpha_{th2}$), the controller 16 determines that the cognitive load is "medium".

Further, it is estimated that the change in the acceleration of the vehicle 1 and the cognitive load of the vehicle 1 are larger when the index value $\alpha$ exceeds the upper limit of the second range than when the index value $\alpha$ is within the second range. Meanwhile, when the index value $\alpha$ is below the lower limit of the first range, it is estimated that the driver gives up controlling the acceleration due to the large cognitive load. Accordingly, the controller 16 determines that the cognitive load is "large" when the index value $\alpha$ is outside both the first range and the second range (that is, $0 \le \alpha < \alpha_{th0}$ or $\alpha_{th2} \le \alpha$).

When the cognitive load is determined, the controller 16 executes different processes according to the degree of the cognitive load.

Specifically, when it is determined that the cognitive load is "small", the controller 16 adjusts the parameter regarding the recognition speed of the speech recognition decoder such that the response time in the speech dialogue becomes the "standard time," while continuing the speech dialogue. Meanwhile, when it is determined that the cognitive load is "medium", the controller 16 adjusts the parameter regarding the recognition speed of the speech recognition decoder such that the response time in the speech dialogue becomes longer than the "standard time," while continuing the speech dialogue. As such, as described above, the controller 16 dynamically controls the response time in the speech dialogue by adjusting the parameter regarding the recognition speed of the speech recognition decoder according to the index value α calculated in every predetermined period of time based on the acceleration of the vehicle 1.

Figure 3:
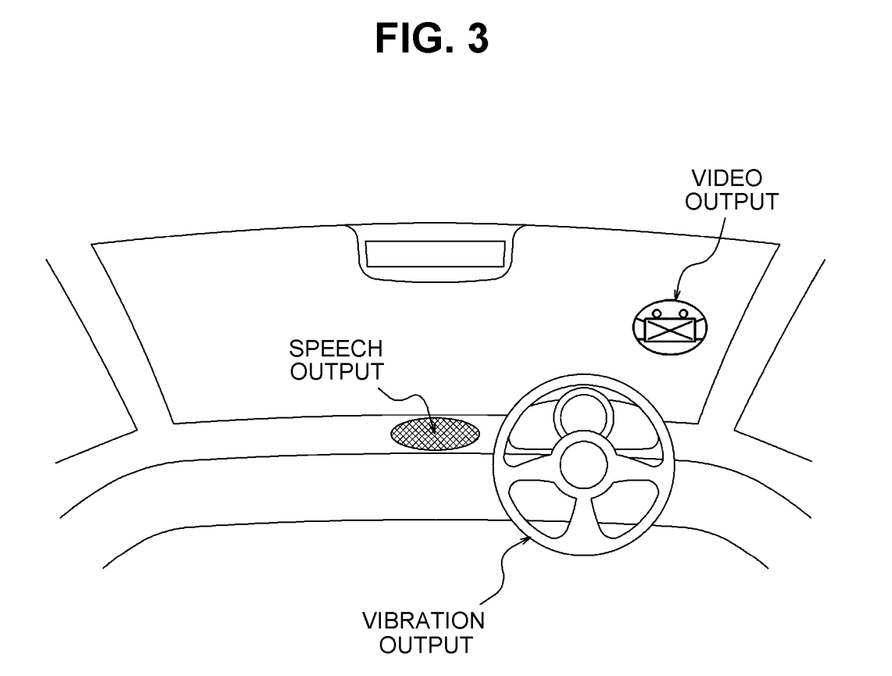
FIG. 3 is a diagram illustrating an example of an alarm issued for a driver.

When it is determined that the cognitive load is "large", the controller 16 simultaneously stops the speech dialogue and issues an alarm for the driver by outputting vibration, speech, and/or video through the output unit 14. As illustrated in FIG. 3, the corresponding alarm is issued by, but is not limited to, for example, vibrating a steering wheel, an accelerator pedal, a seat, or the like, outputting speech notifying the stop of the speech dialogue, and/or outputting video notifying the stop of the speech dialogue. The video may be displayed to be in a relatively small size for a relatively short time to the extent that driver distraction does not occur. When it is determined that the cognitive load is "small" or "medium" after the speech dialogue stops, the stop of the speech dialogue is released and the speech dialogue continues as described above.

Operation Flow of Information Processing Apparatus

Figure 4:
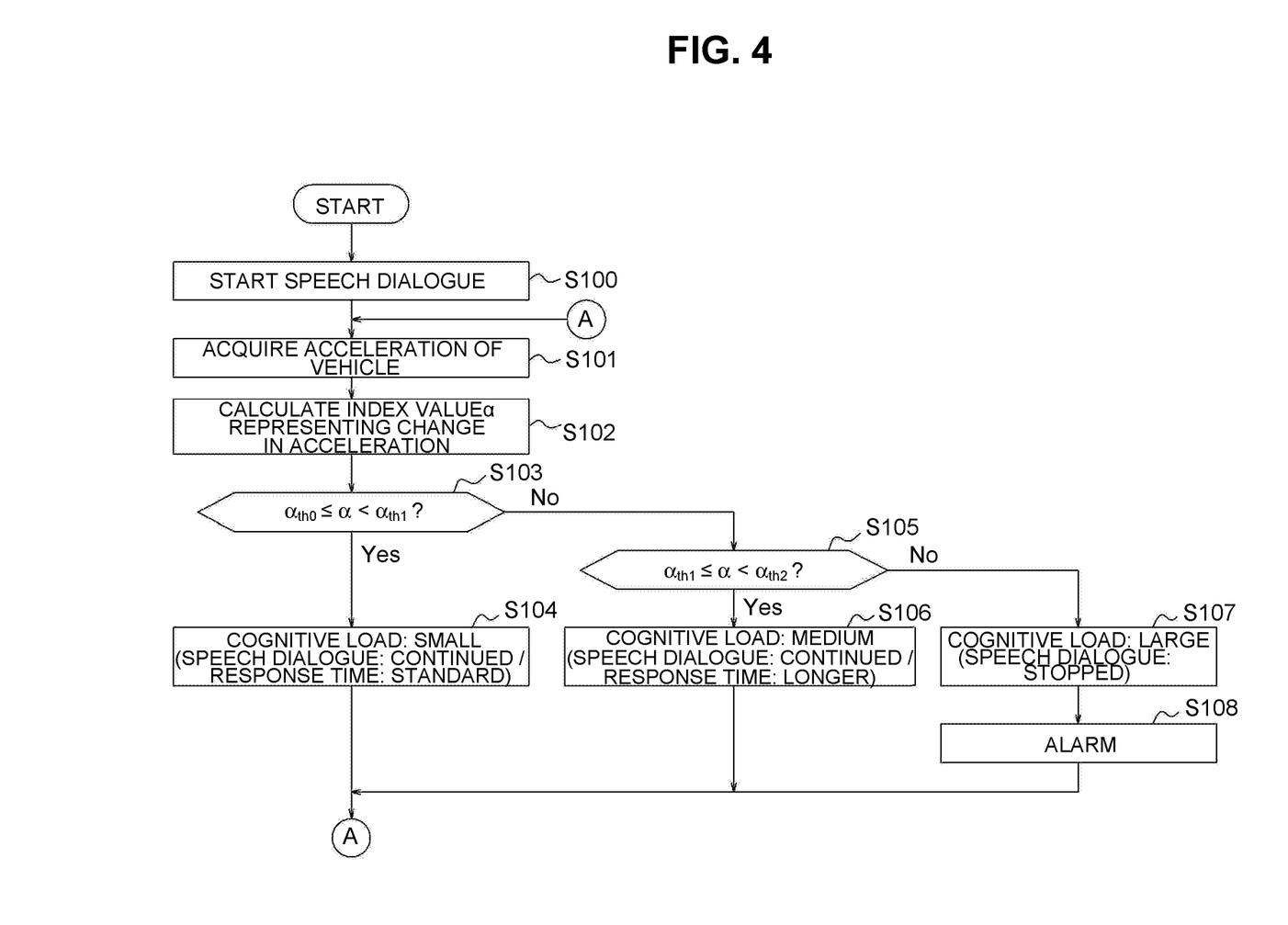
FIG. 4 is a flowchart illustrating an operation of the information processing apparatus.

With reference to FIG. 4, the flow of the above-mentioned operation of the information processing apparatus 10 will be described.

Step S100: The controller 16 starts the speech dialogue using the speech dialogue software stored in the storage unit 12 when the predetermined speech input is received through the input unit 15.

Step S101: The controller 16 acquires the acceleration of the vehicle 1 through the acquisition unit (the communication unit 11 or the sensor unit 13).

Step S102: The controller 16 calculates variance, standard deviation, or a difference between a maximum value and a minimum value of the acceleration of the vehicle 1 in every predetermined period of time as an index value α, representing a change in the acceleration.

Step S103: The controller 16 determines whether the index value α is within the first range (that is, $\alpha_{th0} \leq \alpha < \alpha_{th1}$). When it is determined that the index value α is within the first range (Yes in step S103), the process proceeds to step S104. Meanwhile, when it is determined that the index value α is outside the first range (No in step S103), the process proceeds to step S105.

Step S104: When it is determined that the index value α is within the first range in step S103 (Yes in step S103), the controller 16 determines that the cognitive load of the driver due to the speech dialogue is "small" and adjusts the parameter regarding the recognition speed of the speech recognition decoder such that the response time in the speech dialogue becomes the "standard time," while continuing the speech dialogue. Thereafter, the process returns to step S101.

Step S105: When it is determined that the index value α is outside the first range in step S103 (No in step S103), the controller 16 determines whether the index value α is within the second range (that is, $\alpha_{th1} \leq \alpha < \alpha_{th2}$). When it is determined that the index value α is within the second range (Yes in step S105), the process proceeds to step S106. Meanwhile, when it is determined that the index value α is outside the second range (No in step S105), the process proceeds to step S107.

Step S106: When it is determined that the index value α is within the second range in step S105 (Yes in step S105), the controller 16 determines that the cognitive load of the driver due to the speech dialogue is "medium" and adjusts the parameter regarding the recognition speed of the speech recognition decoder such that the response time in the speech dialogue becomes longer than the "standard time," while continuing the speech dialogue. Thereafter, the process returns to step S101.

Step S107: When it is determined that the index value α is outside the second range in step S105 (No in step S105), the controller 16 determines that the cognitive load of the driver due to the speech dialogue is "large" and stops the speech dialogue. Thereafter, the process proceeds to step S108.

Step S108: The controller 16 issues an alarm for the driver by outputting vibration, speech, and/or video through the output unit 14. Thereafter, the process returns to step S101.

As described above, the information processing apparatus 10 according to the present embodiment dynamically controls the response time in the speech dialogue with the driver based on the acceleration of the vehicle 1. Accordingly, when it is estimated that, based on the acceleration of the vehicle 1, the cognitive load of the driver is large, it is possible to control the speech dialogue in consideration of the cognitive load of the driver such as reducing the cognitive load by lengthening the response time. Therefore, the technology to execute the speech dialogue with the driver of the vehicle 1 is improved Although the present disclosure was described based on drawings and an embodiment, it should be noted that variations and modifications can be easily made by those skilled in the art based on the present disclosure. Accordingly, it should be noted that the variations and the modifications are included within the scope of the present disclosure. For example, functions, and the like, included in each element, each step, or the like, can be rearranged so as not to be logically contradictory, and a plurality of elements, steps, or the like may be combined into one or divided.

For example, in the above-described embodiment, some of the configurations and functions of the information processing apparatus 10 mounted on the vehicle 1 may be included in any other apparatus. For example, some of the configurations and functions of the information processing apparatus 10 may be included in another in-vehicle device mounted on the vehicle 1. Alternatively, some of the configurations and functions of the information processing apparatus 10 may be included in an external server. In this case, the vehicle 1 may communicate with a server through an in-vehicle communication device such as a Data Communication Module (DCM) mounted on the vehicle 1.

Moreover, in the above-described embodiment, the configuration in which the cognitive load of the driver due to the speech dialogue is divided into three levels, "small", "medium", and "large," was described. However, the degree of the cognitive load can be divided into any number of levels, such as two or more.

In addition, in the above-described embodiment, the configuration in which the controller 16 of the information processing apparatus 10 dynamically controls the response time in the speech dialogue by adjusting the parameter regarding the recognition speed of the speech recognition decoder based on the acceleration of the vehicle 1 was described. However, the controller 16 may dynamically control the response time in the speech dialogue by adjusting, for example, a wait time of processing based on the acceleration of the vehicle 1 without adjusting the corresponding parameter.

For example, general-purpose electronic equipment may function as the information processing apparatus 10 according to the above-described embodiment. Specifically, a program that describes processing details for implementing of each function of the information processing apparatus 10 according to an embodiment is stored in a memory of the electronic equipment and the corresponding program is read and executed by a processor of the electronic equipment.

Accordingly, the disclosure according to the present embodiment can be implemented as a program that can be executed by a processor.

What is claimed is:

1. An in-vehicle electronic device comprising:
one or more processors configured to:
acquire, from an acceleration sensor, one or more measured acceleration values of a vehicle;
estimate a cognitive load of a driver of the vehicle based on the one or more measured acceleration values;
when the estimated cognitive load of the driver is greater than a threshold value, execute a speech dialogue with the driver of the vehicle at a first response time while the cognitive load of the driver remains above the threshold level; and
when the estimated cognitive load of the driver is not greater than the threshold value, execute the speech dialogue with the driver at a second response time, wherein
the speech dialogue corresponds to a voice service that receives user speech captured by a microphone and controls a speaker to output audio,
the first response time and the second response time correspond to a time from the end of the driver's speech to the start of speech of the in-vehicle electronic device,
the first response time is longer than the second response time, and
the cognitive load of the driver is due to the first response time and the second response time of the speech dialogue.

2. The in-vehicle electronic device according to claim 1, wherein the one or more processors are further configured to dynamically modify a response time of the voice service by adjusting a parameter for recognition speed of a speech recognition decoder based on the one or more measured acceleration values of the vehicle.

3. The in-vehicle electronic device according to claim 1, wherein
the one or more processors are further configured to:
calculate an index value indicating a change in acceleration of the vehicle based on the one or more measured acceleration values of the vehicle; and
control a response time of the voice service such that the response time becomes longer when the index value is within a second range compared to when the index value is within a first range; and
an upper limit of the first range is below a lower limit of the second range.

4. The in-vehicle electronic device according to claim 3, wherein
the one or more processors are further configured to stop the speech dialogue with the driver when the index value is within a third range; and
an upper limit of the second range is below a lower limit of the third range, or an upper limit of the third range is below a lower limit of the first range.

5. The in-vehicle electronic device according to claim 4, wherein the one or more processors are further configured to issue an alarm for the driver when the one or more processors stop the speech dialogue with the driver.

6. The in-vehicle electronic device according to claim 3, wherein the one or more processors are further configured to calculate, based on the one or more measured acceleration values of the vehicle, a variance, a standard deviation, or a difference between a maximum value and a minimum value of the one or more measured acceleration values of the vehicle in every predetermined period of time as the index value.

7. A non-transitory computer-readable medium storing computer program code that, when executed by a processor, causes the processor to:
acquire, from an acceleration sensor, one or more measured acceleration values of a vehicle;
estimate a cognitive load of a driver of the vehicle based on the one or more measured acceleration values;
when the estimated cognitive load of the driver is greater than a threshold value, execute a speech dialogue with the driver of the vehicle at a first response time while the cognitive load of the driver remains above the threshold level; and
when the estimated cognitive load of the driver is not greater than the threshold value, execute the speech dialogue with the driver at a second response time, wherein
the speech dialogue corresponds to a voice service that receives user speech captured by a microphone and controls a speaker to output audio,
the first response time and the second response time correspond to a time from the end of the driver's speech to the start of speech of the in-vehicle electronic device,
the first response time is longer than the second response time, and
the cognitive load of the driver is due to the first response time and the second response time of the speech dialogue.

8. A method of controlling an in-vehicle electronic device, the method comprising:
acquiring, from an acceleration sensor, one or more measured acceleration values of a vehicle;
estimating a cognitive load of a driver of the vehicle based on the one or more measured acceleration values;
executing a speech dialogue with the driver of the vehicle at a first response time; and
executing the speech dialogue with the driver at a second response time, wherein
the speech dialogue corresponds to a voice service that receives user speech captured by a microphone and controls a speaker to output audio,
the first response time and the second response time correspond to a time from the end of the driver's speech to the start of speech of the in-vehicle electronic device,
the first response time is longer than the second response time,
the executing of the speech dialogue with the driver at the first response time is executed while the cognitive load of the driver remains above a threshold level during a first period,
the executing of the speech dialogue with the driver at the second response time is executed during a second period while the cognitive load of the driver is not greater than the threshold level, the second period being different from the first period, and
the cognitive load of the driver is due to the first response time and the second response time a timing of the speech dialogue.

9. The in-vehicle electronic device according to claim 1, wherein the in-vehicle electronic device further comprises the speaker and the microphone.

10. The in-vehicle electronic device according to claim 1, wherein the one or more processors are further configured to:
   determine whether the estimated cognitive load of the driver is in a small category, a medium category or a large category, and
   based on determining that the estimated cognitive load of the driver is in the large category, stop execution of the voice service.

\* \* \* \* \*